United States Patent [19]

Murrell

[11] Patent Number: 5,049,252
[45] Date of Patent: Sep. 17, 1991

[54] WATER CLEANING SYSTEM

[76] Inventor: Wilfred A. Murrell, Wilga Farm, Hillston, New South Wales, Australia, 2675

[21] Appl. No.: 497,850

[22] Filed: Mar. 23, 1990

Related U.S. Application Data

[63] Continuation-in-part of Ser. No. 5,726, Jan. 21, 1987, abandoned.

[30] Foreign Application Priority Data

Jan. 21, 1986 [AU] Australia .............................. PH4293

[51] Int. Cl.$^5$ ................................ C02F 1/46
[52] U.S. Cl. .................................. 204/268; 204/269; 204/275; 210/192; 210/243
[58] Field of Search ............... 210/192, 243, 748, 717; 204/149, 268, 269, 275, 280, 284, 292

[56] References Cited

U.S. PATENT DOCUMENTS

| Re. 26,329 | 1/1968 | Hougen | 204/149 |
|---|---|---|---|
| 3,404,088 | 10/1968 | Dujardin . | |
| 3,479,281 | 11/1969 | Kikindai et al. . | |
| 3,562,137 | 2/1971 | Gehring . | |
| 3,619,391 | 11/1971 | Eisner | 204/149 |
| 3,783,114 | 1/1974 | Ishii et al. | 204/149 |
| 3,816,274 | 6/1974 | Anderson | 204/149 |
| 3,816,275 | 6/1974 | Ichiki et al. | 204/149 |
| 3,817,865 | 6/1974 | Austin | 204/149 |
| 3,853,736 | 12/1974 | Harnden et al. | 204/269 |
| 3,898,150 | 7/1975 | Russell et al. | 204/275 |
| 3,904,521 | 9/1975 | Stopka | 210/192 |
| 3,920,530 | 11/1975 | Xylander | 204/149 |
| 3,925,203 | 12/1975 | Turner | 204/149 |
| 3,944,478 | 3/1976 | Kuji et al. | 204/275 |
| 3,975,269 | 8/1976 | Ramirez | 204/149 |
| 4,012,319 | 3/1977 | Ramirez | 204/149 |
| 4,075,076 | 2/1978 | Xylander | 204/149 |
| 4,189,381 | 2/1980 | Laferty et al. . | |
| 4,197,180 | 4/1980 | Woodward | 204/275 |
| 4,202,767 | 5/1980 | Alfenaar . | |
| 4,294,697 | 10/1981 | Sawa et al. . | |
| 4,311,595 | 1/1982 | Julke . | |
| 4,623,436 | 11/1986 | Umehara | 204/149 |

FOREIGN PATENT DOCUMENTS

| 255770 | 12/1960 | Australia . |
|---|---|---|
| 5625180 | 7/1980 | Australia . |
| 0100538 | 2/1984 | European Pat. Off. . |
| 0128782 | 12/1984 | European Pat. Off. . |
| 0187720 | 7/1986 | European Pat. Off. . |

Primary Examiner—Peter Hruskoci
Assistant Examiner—Robert James Popovics
Attorney, Agent, or Firm—Cushman, Darby & Cushman

[57] ABSTRACT

A method and apparatus for treating water contained in a tank to remove contaminants by passing a current through a novel electrode arrangement characterized by vertically disposed electrodes plates. Positive and negative half length electrode pairs are arranged vertically with respect to one another. Such electrode pairs are used in conjunction with full length, active or passive vertical electrode plates which are each adjacent a vertical pair. Preferably the electrodes and tank are made of aluminium.

10 Claims, 7 Drawing Sheets

WATER CLEANING SYSTEM

This application is a continuation in part of U.S. application Ser. No. 07/005,726 filed 01/21/87, now abandoned.

This invention relates to the treatment of contaminated water for domestic and other uses.

Many city and town water supplies contain impurities and some are turbid. Waters taken from irrigation channels, farm dams and directly from rivers are often unsatisfactory for domestic and other uses until treated to remove impurities.

Conventional methods of treatment include filtering with or without the addition of chemicals. Used on their own, filters are often unsatisfactory, permitting microfine suspended matter and color to pass through and the water remains cloudy. For many years a commonly used method of water treatment provides for the addition of aluminium sulphate to the water. Trivalent $AL^{+++}$ is very effective at flocculating negatively charged suspended particles and hence is useful for clearing turbid water. Most contaminants carry small negative electrical charges. The combined particles then group or cluster together into loose accumulations or flocs, which slowly settle to the bottom of the processing tank. After a period of time, the treated water is then taken from the tank and filtered, using sand filters, to remove the remaining flocculents. More chemicals such as soda ash or other alkaline chemicals are then added to the processed water to balance out the pH changes caused by the addition of alum. Often chlorine or other disinfectants are added to reduce algae growth and bacteria.

Left behind in the tank is a gelatinous watery sludge containing the alum flocculent and contaminants. This sludge has to be removed before the next batch of water can be treated and the sludge finally disposed of.

As may readily be seen, this chemical method can be both expensive and hazardous to one's health, while requiring frequent maintenance of apparatus and sludge disposal.

Other water treatment apparatus exist in which an electric current is passed through the water by way of electrodes, however, these devices and methods in the past have been complex and costly.

Furthermore, the use of certain metals such as copper, silver and iron for the electrodes does work to remove some pollutants but further contaminates the water with the metal itself.

It is therefore an object of the present invention to provide a method and apparatus for treatment of such water, which will overcome or substantially remove the disadvantages of the prior art.

Accordingly, in one broad form, the present invention may be said to provide an apparatus and method of treating water for the separation and removal of contaminants, said method comprising the steps of: introducing a quantity of untreated water into a container; passing DC or rectified AC electricity through the water by way of vertically arranged aluminium electrodes so as to treat the water causing at least some of the contaminants to rise; removing at least part of the water contaminants from the surface of the water; and removing at least part of the treated water.

In another broad form of the invention, the apparatus comprises top and bottom electrodes as well as full length electrodes between each vertically adjacent top and bottom pair. The intermediate electrodes may be active or passive.

This invention in its preferred form does not need the addition of chemicals or the use of filtration to provide crystal clear clean water. The present invention in its preferred form is more efficient and economical than other known methods.

Preferably the current is set at a sufficient amperage to cause the treatment to be effective in from one to three hours.

It is also preferred that the electrodes are produced from aluminium.

The invention, in another broad form, can also be said to provide a water treatment apparatus comprising: a tank; and a plurality of vertically arranged electrode pairs within said tank. Full length electrodes are provided between each pair.

Preferably the apparatus includes means for removing contaminated matter floated to the surface during treatment of the water within the tank.

Preferably the voltage and current are adjustable so that the current may be set at sufficient amperage to carry out the treatment of the water in approximately one to three hours.

The means for removing contaminated matter floated to the surface of the water in the tank can be, in one preferred form, a weir-like lip at one upper extent of the tank, or two similar weir-like lips at opposite ends, being slightly below the remaining perimeter of the upper sides of the tank, or the tank can be set up with one end slightly lower than the other. The floating contaminated matter can be swept from the surface of the water, over either a lip, or lower end into a receptacle for disposal.

Alternatively one means, in another preferred form, can be a scoop or skimming device.

BRIEF DESCRIPTION OF THE DRAWINGS

By way of example only, a preferred form of the present invention will now be described with reference to the accompanying drawings in which:

FIG. 8 depicts a portion of the electrode of FIG. 7a.

Impure water is a conductor of electricity. In this invention, water is purified by a process of passing an electrical direct current or rectified alternating current through the water, polarizing some impurities and at the same time producing extremely small gas bubbles.

The small gas bubbles generated in this process quickly disperse throughout the water in the tank and act in a manner similar to positively charged particles, attracting the negatively charged contaminant particles, causing them to clump or group together, forming a floc. Although much contamination is heavier than water, in this process, most of the formation will readily float to the surface because of the gas content, with only a small proportion of the floc remaining in suspension after the electric current is removed, when it will either slowly float to the surface or settle to the bottom of the treatment tank.

Figure 1:
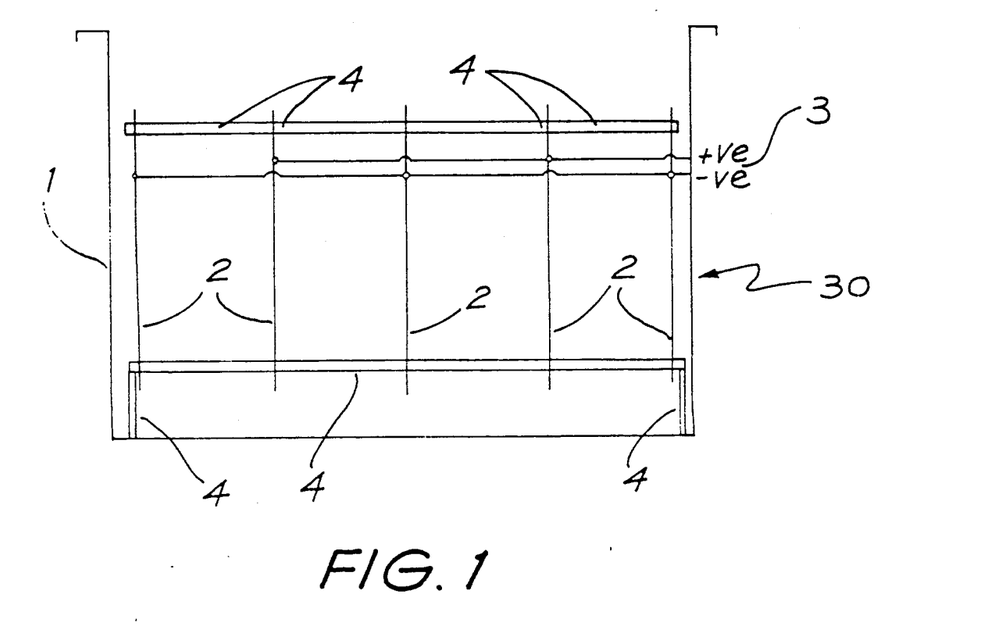
FIG. 1 is a schematic representation of a cross sectional view of an embodiment of the invention in which all of the electrodes are connected to a power supply.

FIG. 1 shows a water treatment apparatus 30 comprising a tank 1 in which are assembled a number of electrodes 2. The electrodes 2 are adapted to be alternatively positive and negative and are provided with respective interconnections 3 for connection to a suitable power supply (not shown). The electrodes 2 are positioned within the tank 1 and insulated from the tank and from one another, using insulating supports 4.

Figure 2:
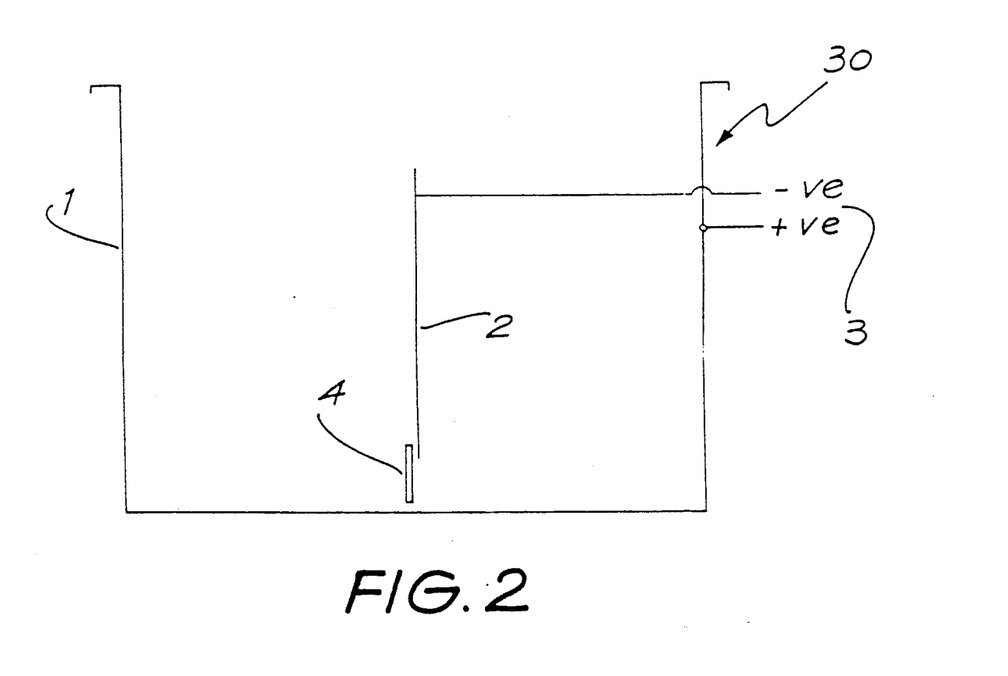
FIG. 2 is another schematic representation, but of simpler embodiment, wherein the tank is of metal construction and acts as one of the electrodes.

FIG. 2 shows a simpler embodiment in which the tank 1 forms one of the electrodes and a second electrode 2 is positioned in the centre of the tank 1 and insulated therefrom. With this embodiment the tank may be square or rectangular or may be an upright cylinder with the electrode 2 being a pipe or similar linear electrode.

Figure 3:
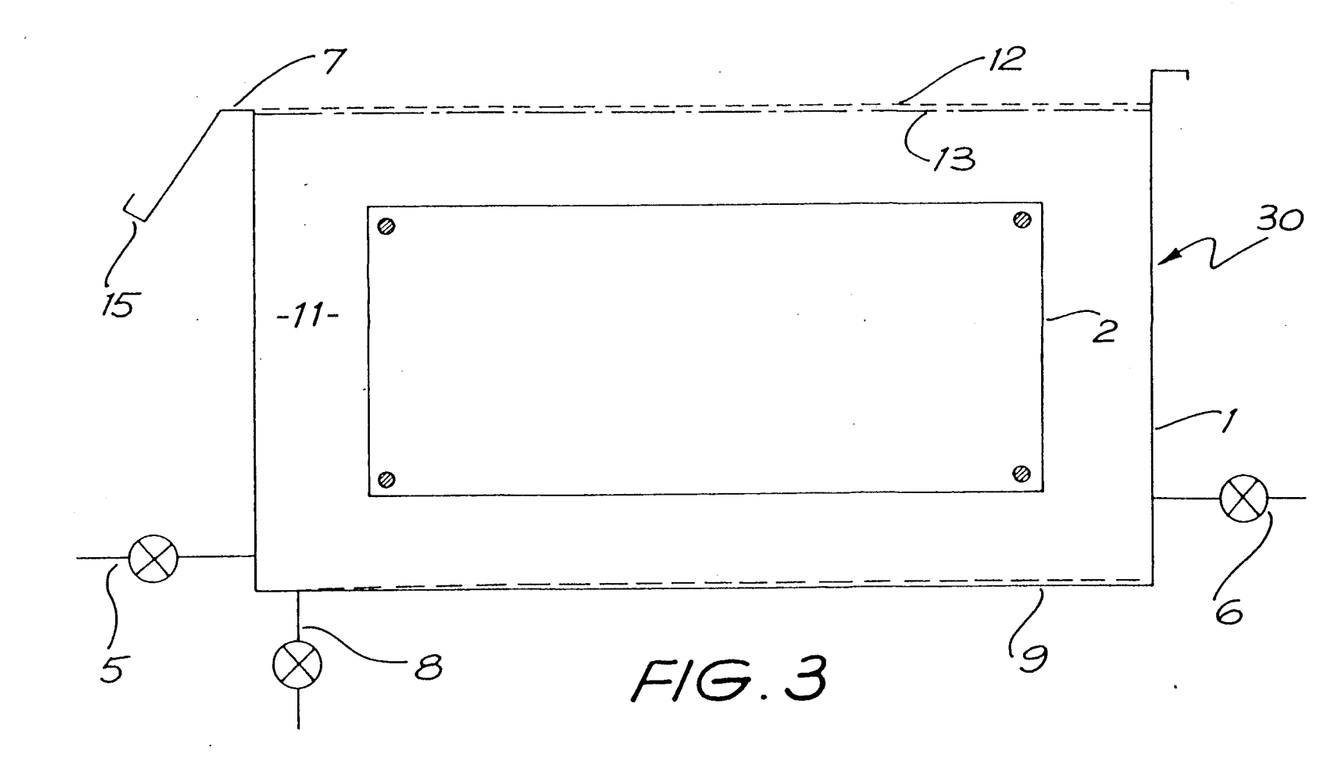
FIG. 3 is a schematic representation of a longitudinal sectional view of an embodiment of the invention and illustrating the collection of the contaminants removed from the water being treated.

In FIG. 3 the tank 1 is supplied with a water inlet 5, clean water outlet 6, deposit outlet 8, a weir 7 and a spouting 15. The tank 1 may be tilted very slightly so that the lowest point is at the deposit outlet 8. The locations of the various inlets and outlets 5 to 8 may be selected according to convenience, provided the outlet 6 is approximately 10 cm above the bottom of the tank and the outlet 8 is in the bottom of the tank and the inlet 5 is placed as low as practicable in either end or either side of the tank. The purpose of placing the outlet 8 at the lowest point is for ease of drainage and occasional flushing of the tank 1 when necessary.

The purpose of placing inlet 5 as low as practicable, but in an end or side of the tank 1, is so that the incoming water will disturb and mix with any remaining sediment from the last previous treatment. The purpose of placing the outlet 6 at approximately 10 cm above the bottom of the tank is so that processed clean water can be removed from the tank 1 without disturbing any remaining sedimentary deposits on the bottom. The weir 7 has a function which will be elaborated on hereinbelow but is essentially a low point around the upper perimeter of the tank 1 facilitating the removal of floating debris from the tank 1. The spout 15 is for directing the removed material into a receptacle (not shown) for disposal.

Figure 4:
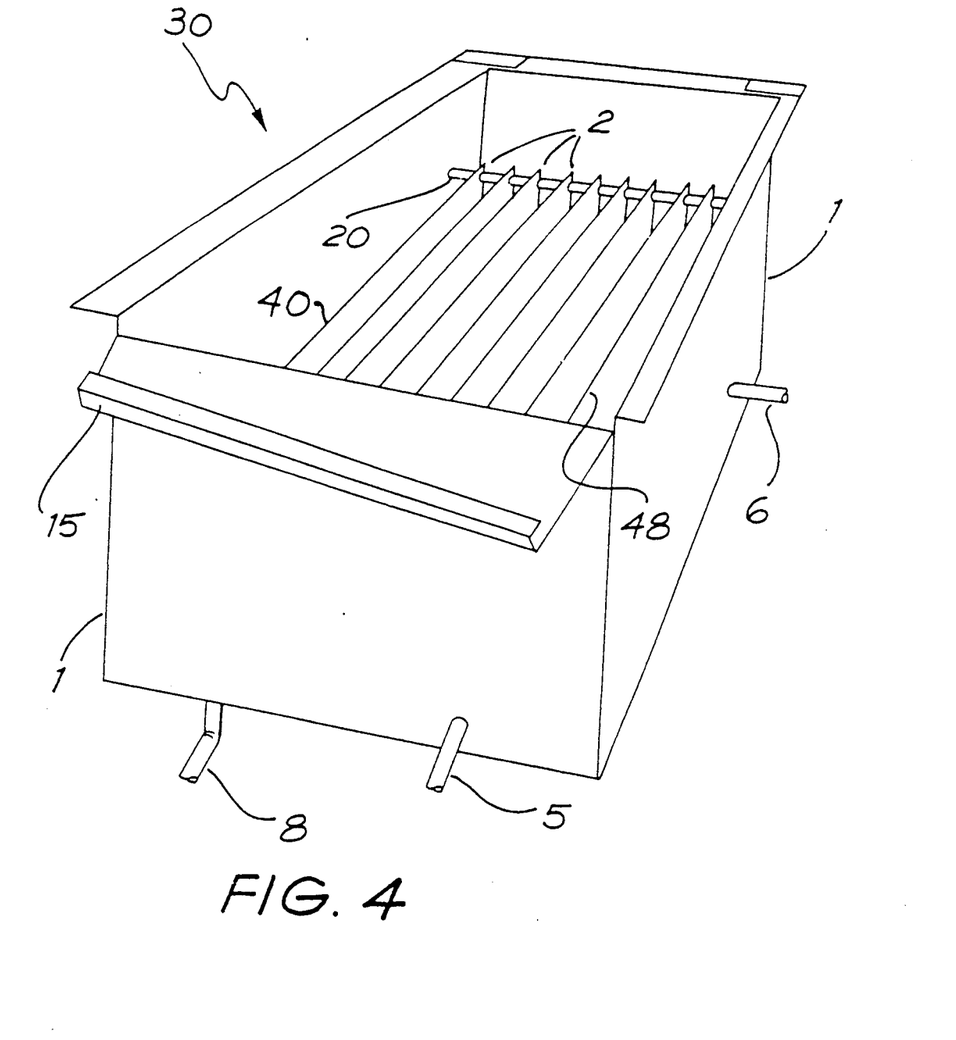
FIG. 4 is a perspective view of an assembled water treatment tank showing nine electrodes.

In FIG. 4 it can be seen that there are nine electrodes 2 in all. In this embodiment the electrodes 2 are suspended on an insulated rod 20 which is attached to the tank 1 by either a removable or fixed fitting. In this way, the electrode assembly can be arranged externally of the tank 1 and placed within the tank 1 in an insulated manner.

In FIG. 4, the nine electrodes 2 may be connected with alternate negative and positive polarities. Alternatively, and preferably, the electrodes 2 are connected so that the outer electrode plate 40 is connected to one polarity and the other outer electrode plate 48 is connected to the other polarity, with the remaining plates insulated and not connected to either polarity. In this configuration, because of the conductivity of the water, the intermediate insulated plates will each take up a voltage proportionate between the potential difference of the two outer plates and therefore all plates become activated. This method allows for the use of higher voltages and lower currents for a given amount of work, having a considerable advantage in larger installations.

The number, size and spacing of electrode plates may be varied in order to obtain the most convenient or most efficient operational conditions.

In operation water to be treated enters through the valve 5 and the tank 1 is filled to the maximum level 13. The electrodes are then connected or switched on to a DC or rectified AC power supply.

The power supply is typically capable of delivering a voltage in the region of say 4 to 40 volts at a current rating depending on the size of the apparatus. Higher voltages may be used in larger installations when adequate safety precautions are observed. For a 12 volt power supply and a domestic sized rectangular tank approximately 1.2 meters (long)×0.75 meters (wide)×0.8 meters (high) and five aluminium electrode plates each 0.8 meters (long)×0.6 meters (deep) connected to alternate polarities a typical preferred current will be 12 to 15 amps.

Preferably the power source will supply 12 to 24 volts direct current or rectified alternating current, with a switch in the circuit. However, voltages and currents are not critical. For very large installations higher voltages offer advantages because of lower currents being necessary to do comparable work.

If water of relatively low conductivity is being processed, it may be necessary to increase the number of plates 2 and reduce spacing between them and/or increase voltage in order to maintain a satisfactory processing time of from one to three hours. When the tank body 1 is made of aluminium it may be connected to the positive polarity to further increase current.

When the tank 1 is made of conducting material and the tank body 1 is connected to one pole of the supply, any number of electrodes 2 will suffice. With the tank 1 insulated from the supply, or when a tank 1 is made of PVC, plastic, fibreglass or other non-conducting material, it is necessary to provide a minimum of two electrodes 2 of opposite polarity, but any higher number of electrodes can be used.

More electrodes 2 and/or closer spacing will increase the amount of current for a specified voltage, or alternatively a lower voltage can be used to maintain a specified current flow. A desirable voltage range of between 4 and 24 is employed for a domestic size tank of approximately 150 imperial or 180 US gallons or 680 liters capacity. Higher voltages are not recommended in domestic installations for safety reasons.

Typically, the power is applied for a period of approximately one hour or longer, however, the time is not critical. Higher currents permit shorter processing times. The minimum satisfactory time taken will depend to an extent upon the voltage and current used and the initial state of the water.

FIG. 3 shows the process as time progresses with a dense material of coagulated contaminant deposits forming in a layer 12 on top of the water, which is a combination of fine gas bubbles and most of the contaminants including heavy contaminants. This layer 12 is formed by the action of extremely small gas bubbles attracting the contaminants and forming a floc, then floating to the surface because of gas content. A light fluffly or woolly looking thin layer 9 will settle to the bottom of the tank, but this layer usually occurs after the removal of the power source and some of the suspended floc has had time to settle.

The floating layer 12 will contain most of the contaminants and can be removed by sweeping it over the lower lip 7 into the spouting 15 and disposed of. For a domestic size tank the removal can be achieved by the use of a batten fitted with a length of rubber insertion material of a length equal to the width of the tank 1 and sweeping the layer 12 over the lower lip 7 into the spouting 15 to a container (not shown) for disposal. Alternatively, a scoop may be used for removal of this layer 12, in which case the scoop should be made of a plastic or insulating material. For typical contaminated river water or farm dam water, the amount of removed material for disposal is approximately one percent of the tank capacity.

When adequate treatment of the water is completed, the power source is switched off and the layer 12 of contaminated material is swept off or otherwise removed. The activity within the tank will continue for some time after the current is removed, because of the charge held in the electrode plates. In a typical operation, after one or two hours, the time not being critical, a further sweeping of a light layer from the surface of the water is advisable but not essential for best results.

Preferably the treated water 11 within the tank 1 is then allowed to settle for several hours or overnight, after which the clean processed water 11 can be removed through the controlled outlet 6.

Because the controlled outlet 6 is positioned some distance above the bottom of the tank, the light layer 9 of settled material is not disturbed when the processed water 11 is removed or pumper out.

After removal of the processed water 11, a new lot of water for treatment is introduced into the tank 1 through the controlled inlet 5, which will stir up the settled light layer 9, mixing it into the incoming water and the process is repeated.

The tank 1 does not need to be cleaned or flushed out until after very many cycles, because the residue from one treatment cycle is mixed with the incoming water and most of it goes out with the sweeping of layer 12 on the next cycle.

If it is desired to clean out the tank 1, it is only necessary to open the controlled outlet 8 until the remaining water is drained away and then hose out the tank and electrode plates with preferably clean water.

It is preferred that all the electrodes 2 are produced from sheet aluminium of 1.5 mm or heavier gauge, however the electrodes may be in the form of sheets, plates, rods, tubes, mesh or net, the number varied and additional electrodes made of other materials such as carbon. The surface area of the electrodes 2, spacing, voltage and the conductivity of the water all contribute when determining the amount of current in the circuit. In fact, with well worn aluminium electrodes, the pitting on the surface of the electrode acts so as to effectively increase the surface area leading to increased performance.

The tank 1 may be made of conducting material, preferably aluminium. Alternatively the tank 1 may be made of non-conducting material such as fibreglass, PVC or other. Tank 1 shape is unimportant other than that a square or rectangular tank is easier for removal of the floating contaminants.

When the tank 1 is made of aluminium, it may be either connected to the positive polarity or be fully insulated from the power source.

If the tank 1 is connected to the negative polarity, it will function normally, but the tank inner surface will deteriorate over a length period of time. When the tank 1 is made of conductive material but insulated from the power source and electrodes, the tank 1 will take up a potential somewhere between the negative and positive voltages of the electrodes.

Because of the characteristic of the system described in the last preceding paragraph, metallic tanks of some materials are unsatisfactory for extended use, for example, galvanised iron, because the galvanising will deteriorate rapidly. Tanks made of plastic materials are preferable to metal tanks, with the exception of aluminium.

For a 12 to 14 volt power source the range is preferred between half to one milliampere per square centimeter of electrode area of 15 to 40 milliamperes per liter of water capacity of the treatment tank. The preferred range of milliwatts per liter is 200 to 500 milliwatts. Large departures from these parameters will work satisfactorily, but with lower energy rates times will be extended.

If water of slightly reduced quality is acceptable, then processing time can be considerably reduced by increasing currents and decreasing settlement time.

The size of treatment tanks can be anywhere from very small units suitable for travellers to carry and operate from flashlight cells or small portable units for campers to operate from automobile batteries, up to the largest installations suitable for city water supplies.

Further preferred electrode arrangements are disclosed with reference to FIGS. 5–8. It should be appreciated that these electrode arrangements may be used in conjunction with a wide variety of tanks and methods including those previously disclosed or suggested herein. The following electrodes offer some or all of the following advantages over electrodes known in the prior art, while offering at the same time low cost and simplicity:

(a) they provide a wider control over currents in order to cope with a variety of raw water conductivities by varying connections possibilites to terminals on the outside of the tank;

(b) they improve water circulation within the tank during treatment;

(c) they improve efficiency over previous element types by producing a smaller microbubble for a given current density;

(d) they provide extended life of the element electrode plates over previous types;

(e) they reduce the amount of residual deposits settling to the bottom of the tank, thereby extending the number of cycles between draining and hosing out;

(f) they enable easier and less time-consuming change-over when removing and replacing an element module; and (g) they extend the range of operation for waters of higher conductivities, but still using all the surface area of the element module plates, therefore increasing plate life.

With reference to current control and versatility the following should be noted. Early versions of apparatus made in accordance with the teachings of the present invention utilized power transformers having secondary windings of 16.5 volts. Improved versatility was realized with upgraded transformers having primary windings with 220, 240 and 260 volt tappings and secondary windings with tappings at 9, 18 and 26 volts. Secondaries preferably have 25 amperes continuous rating, providing rectified voltages of approximately 7, 15 and 23 volts.

These various voltages may be applied to a versatile electrode arrangement 100 as shown in FIGS. 5-8. In the electrode arrangement depicted in FIGS. 5a-5h is characterized by a first bank of 5 lower electrodes 101, a second bank of 5 lower electrodes 102 (alternating with the first lower electrodes 101), a bank of 10 upper electrodes 103, and a bank of 11 full length electrodes 104. The upper and lower electrodes are about half as long as the full length electrodes. The upper electrodes are each associated with a vertically adjacent lower electrode. The full length electrodes alternate with the other electrodes. As a result there are four terminals a, b, c and d to the electrodes which are preferably located on the exterior of the purifying tank. Terminal a is connected to the full length electrodes which are connected to one another. Terminal b is connected to the first lower bank 101. Terminal c is connected to the second lower bank 102. Terminal d is connected to the upper bank 103. If positive voltage is applied to terminal a and negative voltage is applied to terminals b, c and d (as shown in FIG. 5a) then the current at a given voltage for the arrangement of FIG. 5a is designated 24x. It follows that the current of the terminal arrangement of FIG. 5b would be 18x. The arrangements suggested in FIGS. 5c and 5d yield a current of 12x, the 5c arrangement wearing out the lower electrodes only, and the 5d arrangement wearing only the upper electrodes.

Figure 5A:
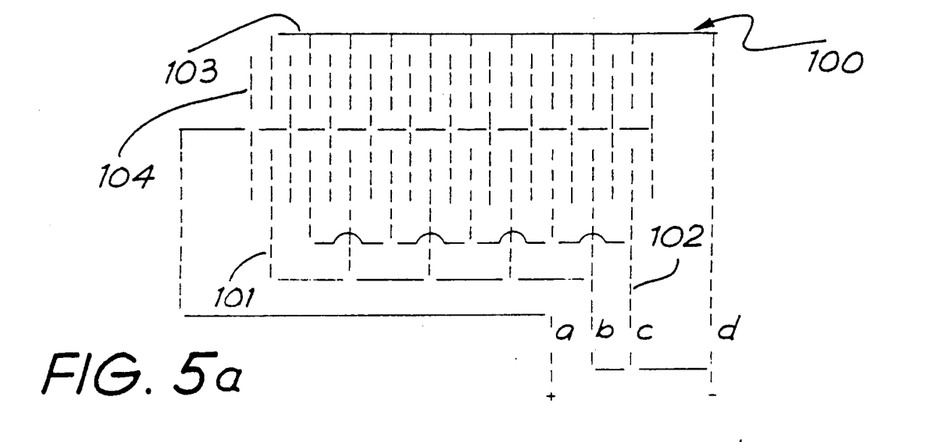
FIGS. 5a-5h depict schematically an arrangement of electrodes and possible connection variations attainable utilizing the teachings of the present invention.
Figure 5B:
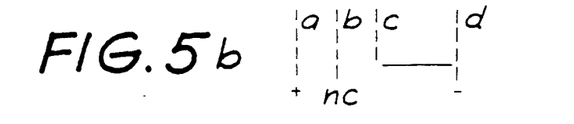
Figure 5C:
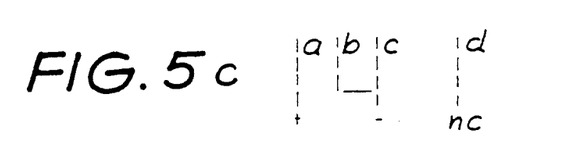
Figure 5D:
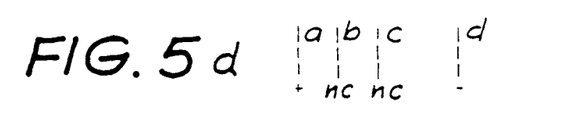
Figure 5E:
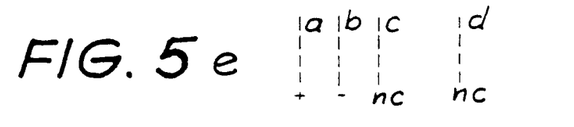
Figure 5F:
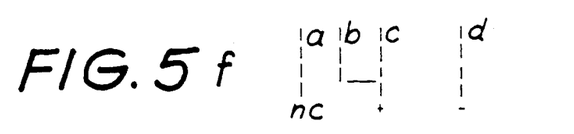
Figure 5G:
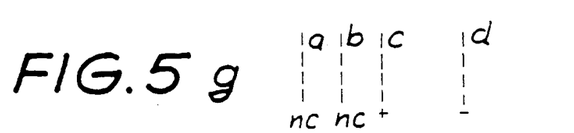
Figure 5H:
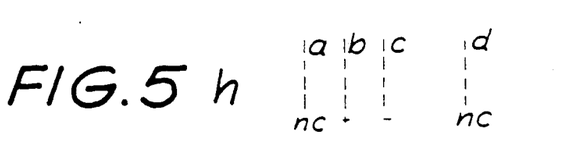

The connection depicted in FIG. 5e is considered undesirable because of a relatively fast wear on only 25% of the plates and giving 6x current, whereas the connections shown in FIG. 5f also gives 6x current, but has all plate surfaces in operation, thus extending electrode life greatly. This is considered the best electrode terminal connection arrangement in the group shown in FIGS. 5a-5h. FIG. 5g shows a connection arrangement for a 45x current and FIG. 5h provides a current of 3x. In practice waters with many different conductivities can be processed with a device having the electrodes 100 connected as shown in FIG. 5f. The FIG. 5a connection arrangement may be more appropriate for low conductivity water.

Water circulation within the tank is provided by action of rising oxygen and hydrogen microbubbles. These electrode element modules provide a greater area coverage of the bottom of the tank for a given total plate surface area and may be located approximately 70 to 80 mm above the tank bottom in a position which causes a symmetrical circular water motion, like a "figure 8" on its side, when viewed end on to the element module. Gas is produced from every square centimeter of active plate surface and all gas originates in approximately the lower 30% of water, with 70% of the water being above the top of the plates. This provides a gentle but thorough circulation of water within the tank every few minutes, without any mechanical aid or moving parts. Horizontal spacing between element electrode plates is around 23 mm which is not critical, but this spacing does provide easy circulation of water through the element.

Efficiency has been greatly improved by the arrangement of having half of the plates divided into two pieces, one above the other, with a vertical gap of approximately 20 or more millimeters. It will be noted in FIG. 5a that there is one row of half plates on the top and one row of half plates on the bottom. For example in a 21 plate element module, there are 10 half plates on the top connected to terminal d and 10 half plates on the bottom with 5 half plates connected to terminal c and the other 5 connected to terminal b. The eleven full sized plates are interconnected to each other and connected to terminal a. All connections may be self contained within the module, with terminals a, b, c and d brought out to inside the power supply box externally of the tank. The greatest efficiency is with FIG. 5f, where the negative potential is connected to the top row of half plates and the positive potential connected to all the bottom row of half plates (in essence forming a single lower bank of lower electrodes) with no connections to the full sized plates, which are in series and taking up half the value of voltage between the bottom and top plates. Polarity reversal will give identical results and a double pole double throw switch may be built in for this purpose, being reversed every alternate batch. This evens up wear and reduces scale build up on element plates.

The precise number of electrodes is not critical. For the sake of clarity a five element arrangement is further explained with reference to FIG. 6. In this example it will be seen that a 12 volt negative potential is applied to terminal d which is activating half plates y and w. In turn we have the positive of this supply connected to terminals c and b which are providing a zero positive potential to half plates r and t. The three full sized plates have no power directly connected to them, but as water is a conductor and plates equally spaced, then the three full sized plates will take up a potential of negative 6 volts. In other words we have a 12 volt supply, but there will only be 6 volts between any two adjacent plates. The centre one of these full sized plates xs will be described, but others will operate in exactly the same manner. The top half of this plate x, being a negative 6 volts will be 6 volts positive relative to half plates y and w which are at negative 12 volts, whereas the bottom half of the xs or s which is also at negative 6 volts will be negative 6 volts relative to the two lower half plates r and t, which are at zero positive potential.

Figure 6:
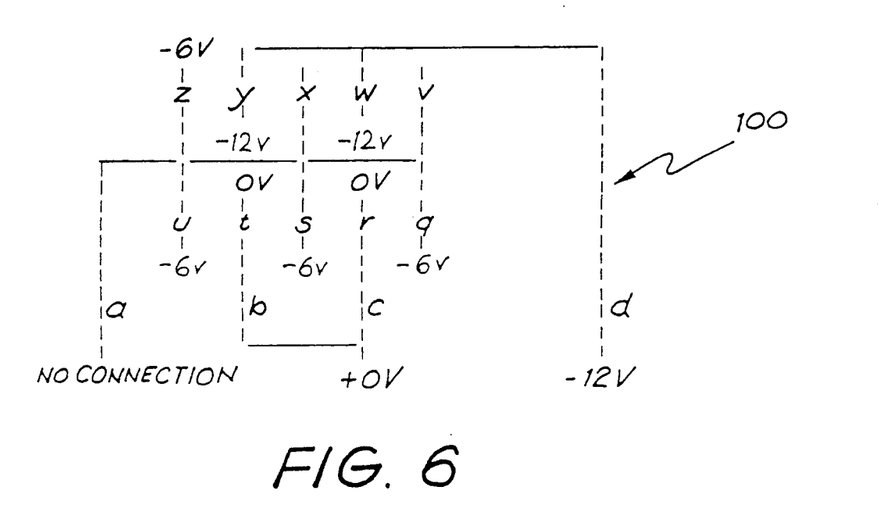
FIG. 6 depicts a schematic of a five element electrode according to the present invention.
Figure 7A:
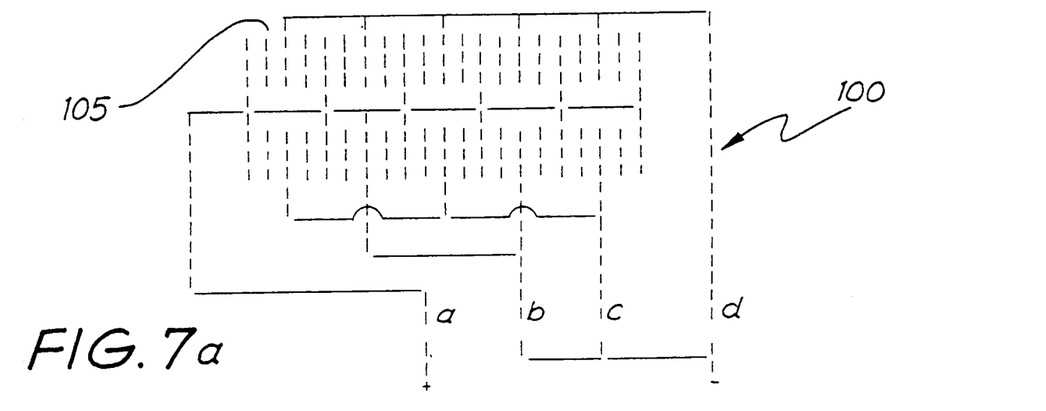
FIGS. 7a-7h depict schematically another embodiment of the present invention.
Figure 7B:
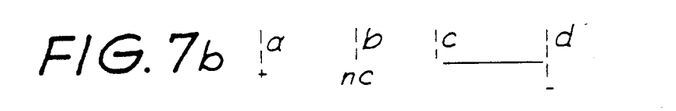
Figure 7C:
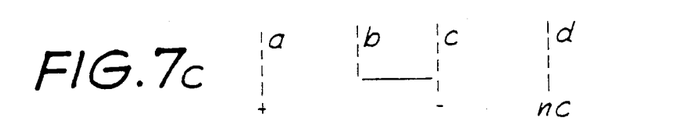
Figure 7D:
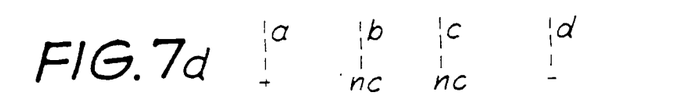
Figure 7E:
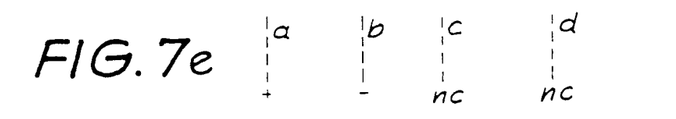
Figure 7F:
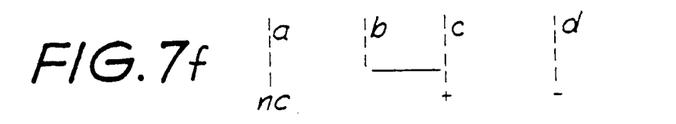
Figure 7G:
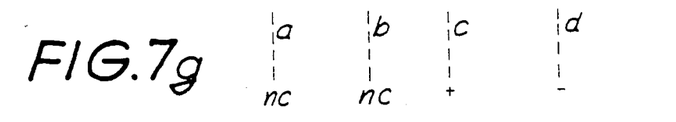
Figure 7H:
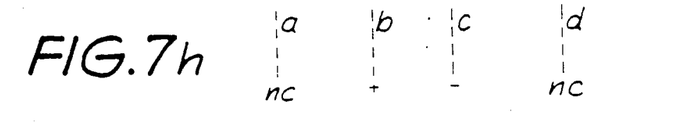

Under these circumstances, the lower half of the full sized plates u, s and q will generate hydrogen microbubbles, whereas the top halves z, x and v will generate oxygen microbubbles. Although they are at the same voltage of negative 6, because of the voltage dividing action of the water resistance, or conductivity, relative to their adjacent plates, the top halves will act precisely like positive plates and the bottom halves will act precisely like negative plates. Therefore these gases will rise in the same plane and intermingle, which has the effect of reducing the tendency of many small hydrogen bubbles from joining together and forming a larger hydrogen bubble. Because the half plates are at opposite polarities, in this case the top ones being negative and the lower ones being positive, the same thing applies. Both oxygen and hydrogen microbubbles will rise together above every one of the plates. This provides a more rapid and better dispersal of hydrogen bubbles throughout the water being processed. Hydrogen bubbles, being more prolific and lighter than oxygen bubbles, rise more rapidly and rising from all the plates gives a superior circulation rate of the water during treatment.

The designs incorporating split plates with intermediate plates have a further advantage over previous designs, inasmuch as a greatly reduced quantity of residue settles to the bottom of the tank. Almost all of the contaminants rise to the surface because of the more efficient production of gas microbubbles.

A further development is an element module as shown in FIGS. 7a-7h with preferably 21 or more plates based on the principles and terminal connection arrangements of the last mentioned type, but being designed for higher conductivity water of above 900 uS/cm. With 21 plates the current range is from 6x to 0.75x or a ratio of 8:1. However for a direct comparison with the last 21 plate element of FIGS. 5a through 5h, this element will draw only a quarter the current for a given connection, voltage and water. This means that for high conductivity water of more than 900 uS/cm, this new element has the advantage of being capable of using a higher voltage when all the plate surfaces are energised.

This design provides an additional half sized plate 105 between each activated half plate and the full sized plate. For any given connection the current is one quarter that of the last 21 plate element. The FIGS. 7 and 8 represent this development.

Figure 8:
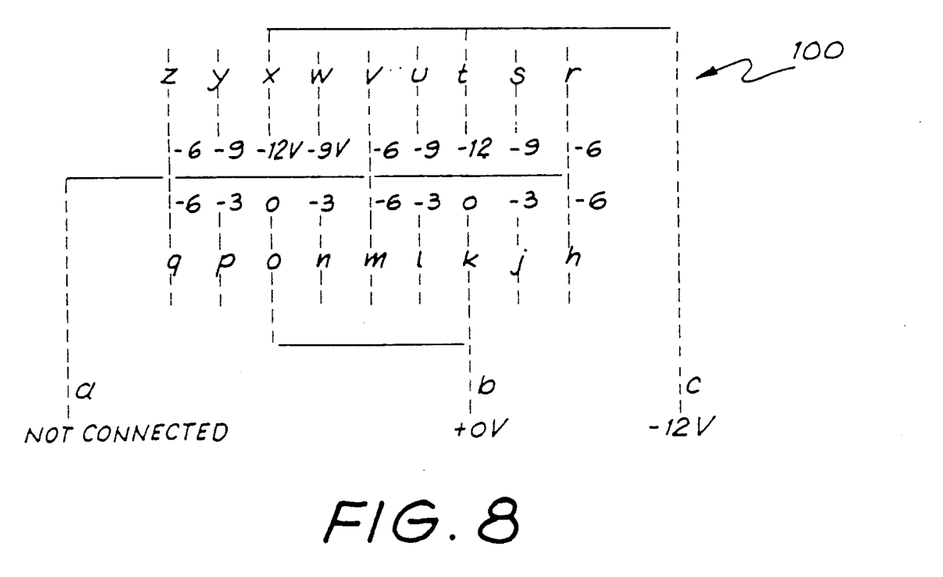

FIG. 8 represents a section of the larger module depicted in FIGS. 7a-7h and is for clarity of description. This design of electrode element is particularly applicable to module elements of 21, 25, 29 and more plates. Although a wide range of voltages can be used in practical applications, in this example, as before, negative 12 volts is applied to the top activated half plates x and t with zero positive potential on bottom half plates o and k. This will produce by voltage dividing action a potential difference of 3 between two adjacent plate surfaces.

In this example, there are half plates and full sized plates in series. As half plate t is activated with negative 12 volts, half plates s and u will take up a potential of negative 9 volts. Therefore t is 3 volts negative from s and u, which in turn are 3 volts negative of full plates s and u closest to t will act as positive electrodes and their opposite sides facing rh and vm will act as negative electrodes. In this example, as in the previous example, the negative electrodes and positive electrodes are in the same vertical plane and will produce their respective hydrogen and oxygen microbubbles, which will intermingle as before, giving a finer gas cloud and at the same time, superior circulation of the water being treated.

This same principle could readily be extended to provide more intermediate half plates for large installations or if higher supply voltages were preferred.

Figure 9:
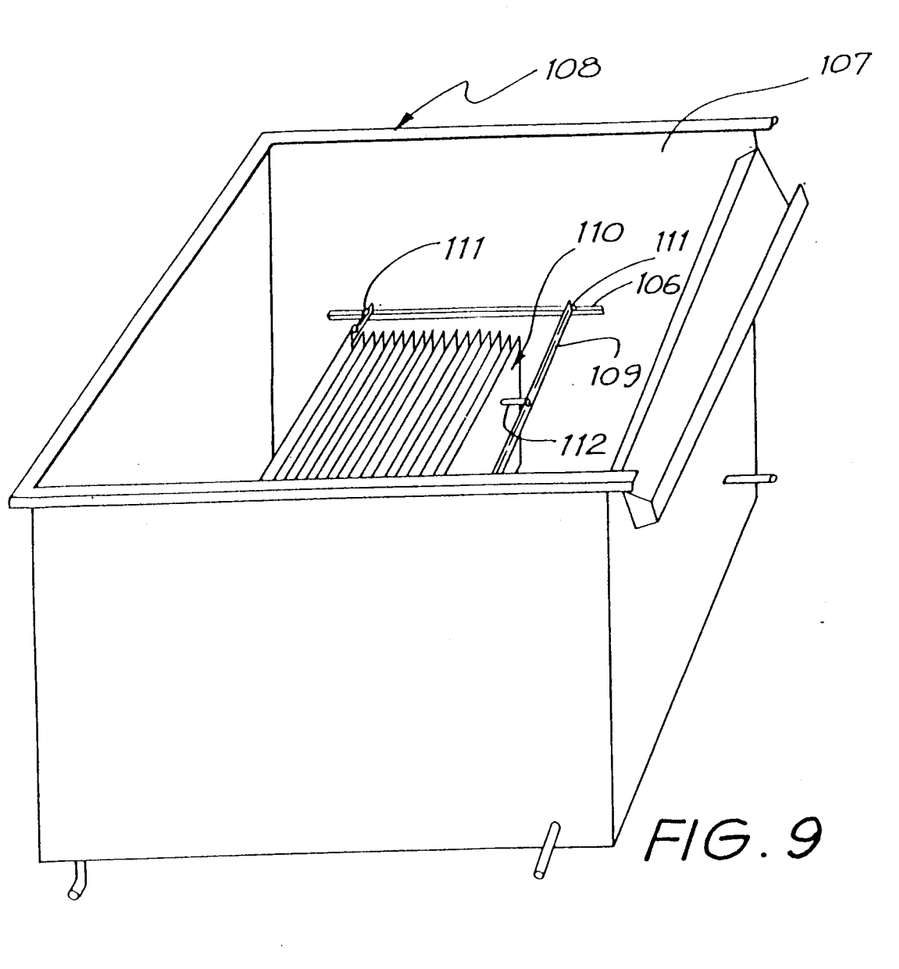
FIG. 9 depicts, in perspective view, a water purifier according to the teachings of the present invention.

As shown in FIG. 9, mounting of element modules has been simplified, by permanently fixing two aluminium angle lengths 106 to the inside surface 107 of the sides of the tank 108 and providing an insulated length of aluminium angle 109 on each side of the element 110. Each end of these two pieces are bolted to the two fixed lengths by four small aluminium or stainless steel bolts and nuts 111. An element module can be changed in short time by removal of the four nuts and bolts, disconnecting the connections to the inside terminals, then replacing with the new element module.

The method of mounting element modules in the last preceding paragraph is satisfactory for safe transport and is simple. However, for on-site replacement, an alternative method is to attach four legs of the correct length to the module side angle lengths and simply place the new element module in the correct location inside the tank and make the electrical connections.

Figure 10:
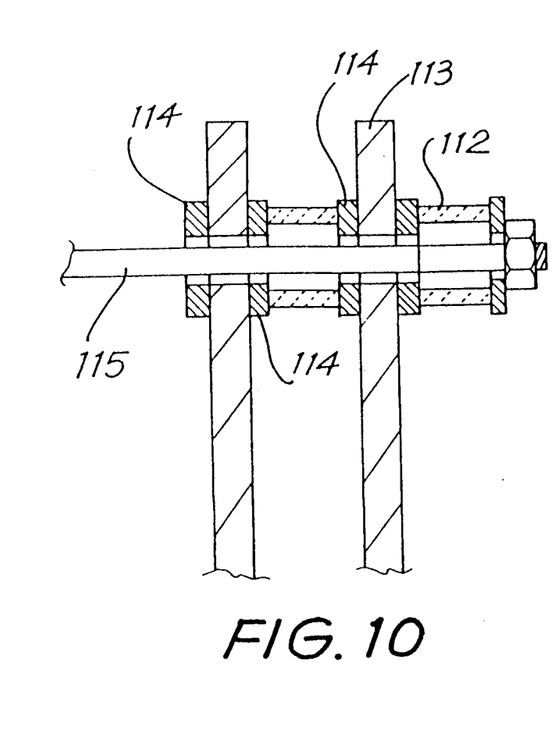
FIG. 10 depicts, in cross section, the attachment of electrode plates to one another as taught by the present invention.

Plate gauge is preferred at about 2 mm or more. By providing more working surface area and heavier gauge element plate material, together with designs which preferably use all the surface areas of the elements, a greater life expectancy of the wearing materials is achieved. The provision of polarity reversal enhances this feature. Further it was discovered that the element plates 113 wear out first where they are in contact with the cylindrical interspacing insulator 112. To increase the life of plates, 1.6 mm gauge aluminium washers 114 (or similar washers) as shown in FIG. 10 are provided next to each side of the plates. The washers add extra material next to the insulating spacers. Both the insulating spacers 112 and washers 114 are shown as surrounding a connecting rod 115 which passes through openings in the electrode plates 113. This feature provides a further means of getting extended life from aluminium plates. Normally aluminium washers will be used with aluminium plates, the washer should be the same material as the plate where other plate materials are used.

It should also be appreciated that while the preferred electrode arrangement is one where all electrode plates are vertical, the electrodes can in fact be utilized in a horizontal orientation. However, since the water circulating effect of the rising gases will be largely lost, an additional means of circulating the water in the tank will be required. A pump, circulator or agitator can be used for this purpose.

While the present invention has been described with regard to particular construction details and materials, it should be appreciated that these are provided by way of example and not as limitations to the scope of the invention as set forth in the claims.

The claims defining the invention are as follows:

1. An electrode arrangement for an electrolytic water purifier comprising:
   an upper electrode bank having one or more upper vertical metallic plates commonly connected to a first terminal;
   a first lower electrode bank having one or more vertical metallic plates commonly connected to a second terminal, each lower electrode spaced from, but located vertically adjacent to an upper plate in an edge to edge relationship;
   each lower and its adjacent upper plate forming an electrode pair;
   a plurality of commonly connected full length electrodes, each extending substantially to the combined length of an electrode pair and connected to a third terminal; and
   each electrode pair disposed between two full length electrodes.

2. The electrode arrangement of claim 1, wherein: two or more electrode pairs are provided.

3. The electrode arrangement of claim 2 wherein there is further provided:
   a second lower electrode bank, comprising one or more vertical metallic plates commonly connected to a fourth terminal, the plates of the second lower bank similar in size and shape to the first lower bank;

the plates of the second lower bank alternating with plates of the first lower bank, each plate of the second lower bank spaced from but vertically adjacent a plate of the upper electrode bank, each plate of the second lower bank and its adjacent plate of the upper electrode bank forming an electrode pair.

4. The electrode arrangement of claim 3 wherein:

between each full length electrode and an adjacent plate of an upper, first, or second lower bank, there is located a passive electrode.

5. An electrode arrangement according to any one of claims 1-4 wherein:

at least one bank is assembled on a connecting rod which passes through an opening in each plate, adjacent plates separated from one another by cylindrical insulators whereby a washer of the same material as the plates is interposed directly adjacent to both sides of each plate.

6. A water purifier comprising:

a tank;

the tank containing an upper electrode bank having one or more upper vertical metallic plates commonly connected to a first terminal;

a first lower electrode bank having one or more vertical metallic plates commonly connected to a second terminal, each lower electrode spaced from, but located vertically adjacent to an upper plate in an edge to edge relationship;

each lower and its adjacent upper plate forming an electrode pair;

a plurality of commonly connected full length electrodes, each extending substantially to the combined length of an electrode pair and connected to a third terminal;

each electrode pair disposed between two full length electrodes;

a water inlet into the tank;

a water outlet leading out of the tank; and a weir like lip provided at an upper edge of the tank.

7. The water purifier of claim 1, wherein:

two or more electrode pairs are provided.

8. The water purifier of claim 7 wherein there is further provided:

a second lower electrode bank comprising one or more vertical metallic plates commonly connected to a fourth terminal, the plates of the second lower bank similar in size and shape to the first lower bank;

the plates of the second lower bank alternating with plates of the first lower bank, each plate of the second lower bank spaced from but vertically adjacent to a plate of the upper electrode bank, each plate of the second lower bank and its adjacent plate of the upper electrode bank forming an electrode pair.

9. The electrode arrangement of claim 8 wherein:

between each full length electrode and an adjacent plate of an upper, first, or second lower bank, there is located a passive electrode.

10. An electrode arrangement according to any one of claims 6-9 wherein:

at least one bank is assembled on a connecting rod which passes through an opening in each plate, adjacent plates separated from one another by cylindrical insulators whereby a washer of the same material as the plates is interposed directly adjacent to both sides of each plate.

* * * * *